Oct. 26, 1943.     G. CROMPTON, JR.     2,332,505
METHOD OF MAKING DIAMOND DISKS
Filed Nov. 19, 1941
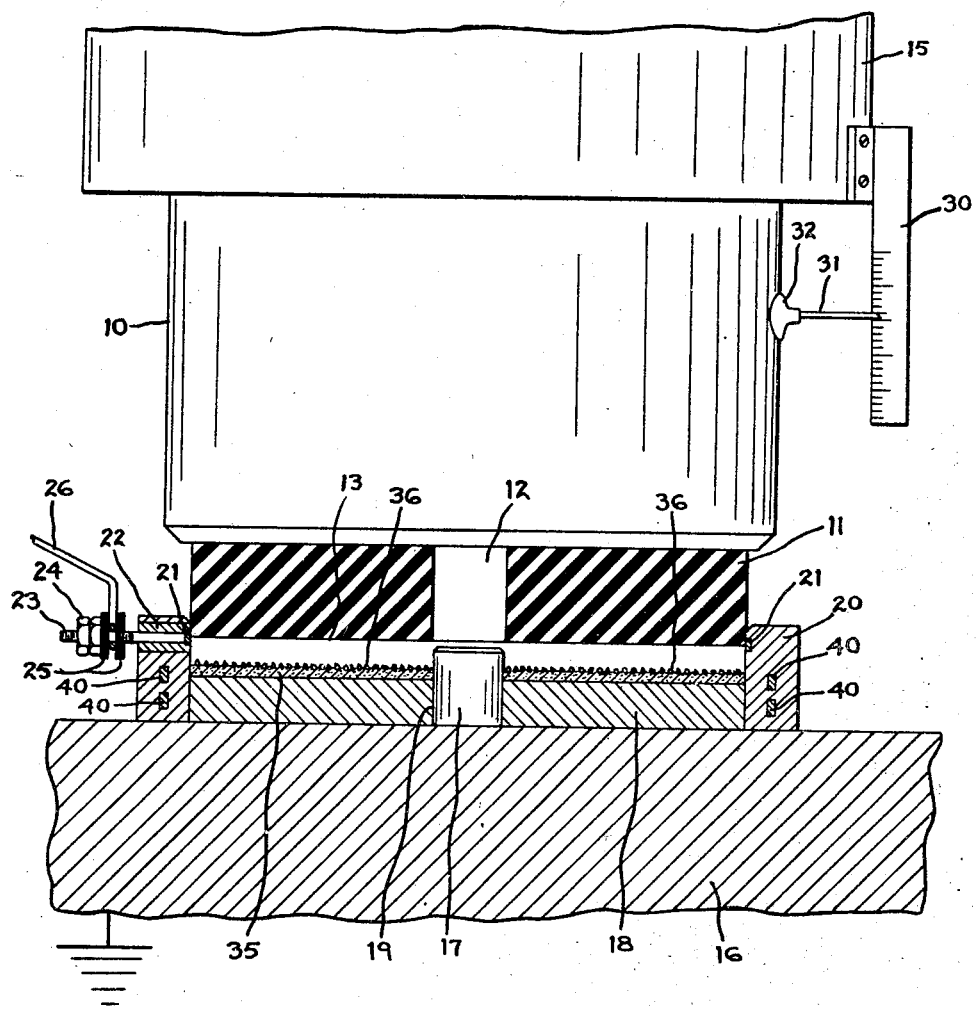
Inventor
George Crompton Jr.

Patented Oct. 26, 1943

2,332,505

UNITED STATES PATENT OFFICE 2,332,505

METHOD OF MAKING DIAMOND DISKS

George Crompton, Jr., Worcester, Mass., assignor to Norton Company, Worcester, Mass., a corporation of Massachusetts Application November 19, 1941, Serial No. 419,766

6 Claims. (Cl. 51—309)

The invention relates to diamond abrasives and more particularly to a disk having a layer of diamond abrasive on one or both sides thereof.

One object of the invention is to provide an expeditious method for making an article of the character indicated. Another object of the invention is to provide a method for making a diamond coated metal disk with the abrasive grains oriented normal to the face of the disk and evenly distributed thereon. Other objects will be in part obvious or in part pointed out hereinafter.

The invention accordingly consists in the features of construction, combinations of elements, arrangements of parts, and in the several steps and relation or order of each of said steps to one or more of the others thereof, all as will be illustratively described herein, and the scope of the application of which will be indicated in the following claims.

In the accompanying drawing the single figure illustrates in side elevation the plunger of a hydraulic press and in section certain molding apparatus according to the invention.

I provide any suitable hydraulic press having a press plunger 10. A low pressure press is adequate for purposes of the present invention. I vulcanize or cement to the press plunger 10 a mold plate 11 of comparatively hard vulcanized rubber which has a central hole 12. The bottom surface 13 of this mold plate is coated with amalgam, for example the amalgam of tin with mercury which may be applied with a little sodium silicate cement. For this purpose tin amalgam may be mixed with a minor portion of sodium silicate and water and then painted upon the bottom of the mold plate 11.

The press has an upper cylinder portion 15 and a bottom press platen 16. The bottom press platen 16 is of course made of steel and the press itself constitutes a ground and in the case of the present invention the entire press should be well grounded to steam pipes of the factory building or separately connected to an earth ground, such as a large metal plate buried deep in the earth, by means of a substantial copper wire. I provide a steel bottom mold plate 18 having a central hole 19. I provide a mold ring 20 made out of "Bakelite" or the like, viz. molded phenol formaldehyde resin, with a suitable dielectric filler such as finely divided quartz or asbestos. Molded into the ring 20 on the inside thereof is a small metal ring 21. Extending through the ring 20 at one side near the top and in contact with ring 21 is a bushing 22 which is internally threaded and receives a binding post 23 on which are nuts 24 and rubber washers 25. A substantial copper wire 26 leads to a source of direct current energy of the order of 1000 to 40,000 volts. In the central hole 19 and in position to project into the hole 12 is a glass mold arbor 17. Preferably the cylinder 15 of the press has attached thereto in any suitable manner a scale 30 and a pointer should be attached to the press plunger 10. It may consist of a short stem of wood or metal 31 projecting from a rubber suction cup 32 which can readily be placed in any desired position on the plunger 10.

Modern presses are capable of accurate control and can be moved to a hairline position and held there for a few moments. By means of the scale 30 and pointer 31 the position of the rubber mold plate 11 can be accurately determined.

I first mold under light pressure a disk 35 from powdered metals. I may use any suitable mixture, for example that set forth in Edward Van der Pyl's Reissue Patent No. 21,165 reissued July 25, 1939, such as a mixture of about 19% tin, the remainder copper. Or I can use any one of the mixtures set forth in Van der Pyl's Patent No. 2,238,351 granted April 15, 1941, for example 25% iron, 25% copper, 25% tin, 25% nickel by weight, as set forth therein. Comparatively pure and finely divided metal powders are used and such can now be procured on the market for use in powder metallurgy.

Simply by weighing out a predetermined quantity of metal powders and pressing in another press with standard mold equipment, I press the disk 35 under slight pressure, for example to the order of 200 pounds to the square inch. I may use the bottom mold plate 18, the "Bakelite" ring 20 and the glass arbor 17 in such other press and simply transfer them bodily to the position shown in the drawing herein after pressing off the upper mold plate. Or I may proceed in any other suitable manner to establish the conditions shown in the drawing herein. Before bringing down the hydraulic press plunger 10 to the position shown, however, I sprinkle a weighed quantity of diamond abrasive grains 36 upon the upper surface of the lightly pressed disk 35. I distribute them as well as I can mechanically. I now bring the press plunger 10 down to the position shown in the drawing. At this moment I throw a main remote control switch that applies electromotive force of the order of for example 10,000 volts through the wire 26 so that an electric charge is distributed over the amalgam coated surface 13 of the rubber mold plate 11 and as soon as the remote control switch is thrown I operate the hydraulic press lever to bring the press plunger 10 down. I then watch the indicator and apply a pressure of for example 10 tons to the square inch. As soon as the movement of the mold plate 11 has eliminated the air space in the mold, by a manipulation of the remote control switch I cut off the electrostatic charge.

The action is as follows: The moment the amalgam coated surface 13 was charged with electricity via the electrostatic generator (not shown), main switch, wire 26, binding post 23, bushing 22 and ring 21, the diamonds 36 were all picked up and moved to the lower surface 13 of the mold plate 11. In so doing the diamonds were distributed evenly upon the surface 13 because of the charge that each one acquired and they were also oriented so as to stand with their longest dimension normal to the surface 13. Abrasive will cling to a charged surface for a period of time of at least a few seconds. Before the diamond particles 36 became fully charged (which would cause them to be repelled from the surface 13), the mold had closed and therefore they were embedded in the originally slightly compacted but now more fully compacted disk 35. The result, after raising the press plunger 10 and stripping the mold, is a pressed metal disk 35 with a layer of diamonds 36 on one side nicely oriented and evenly distributed. It is clear that both sides of the disks can be coated with diamonds by simply repositioning the disk in the mold and repeating the process, but in such case the first pressing of the diamonds into the disk 35 should be at a lower pressure and a hard rubber liner should be used on top of the bottom plate 18 before the second pressing.

The hard rubber mold plate 11 is just hard enough to press the diamonds well into the disk 35 but also soft enough to eliminate shattering of the diamonds and to permit them to retain their orientation. As the amalgam will inevitably wear off, the bottom surface 13 can be painted from time to time therewith.

In order to prevent the "Bakelite" ring 20 from going to pieces it may be reinforced with steel bands 40 molded therein which will not, however, destroy its insulating properties. It should be understood, however, that the pressures given herein are representative merely and the apparatus dscribed is illustrative and an outer steel ring can be used to reinforce the resin ring if desired.

After the article is made as described, it is taken to a sintering furnace and heated in a neutral or reducing atmosphere, preferably nitrogen, to a temperature of for example around 600° or 700° C. to sinter the entire article. The result is a diamond abrasive disk with a single layer of diamonds on one or both sides well embedded therein but nevertheless having their ends projecting therefrom providing a cool free-cutting wheel or disk.

Although the invention has been described specifically with reference to the manufacture of diamond abrasive disks other abrasives such as emery, corundum, fused alumina, or silicon carbide could be used. Furthermore, if desired, a coating of metal plate may be applied around the diamonds after the sintering operation more firmly to embed them. This may be done by electroplating.

It will thus be seen that there has been provided by this invention an article and a method in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. Method of making an article with a single layer coating of abrasive on at least one side thereof which comprises compacting comminuted material into a body to a density which permits further substantial compacting and depositing abrasive grains on a surface of said body in evenly spaced relation, and embedding the abrasive grains in said body, including the steps of depositing a layer of abrasive grains on a surface of said body electrically, energizing the adjacent surface of another body substantially parallel to said first body thereby imparting electrical charges to said abrasive grains to cause them to assume an evenly and uniformly spaced relation while they move from the first body surface to the second body surface, and moving the second body surface with substantial force against said first body surface thereby pressing said evenly and uniformly spaced abrasive granules into the first body and simultaneously further compacting the said first body.

2. Method of making an article with a single layer coating of abrasive on at least one side thereof which comprises compacting comminuted material into a backing and distributing, evenly spacing, and embedding abrasive granules in the preformed backing, including the steps of depositing the granules on one surface and transferring them by electrical attraction to a second surface by which they are returned to said first surface and seated therein.

3. The method of making an article with a single layer coating of abrasive which comprises compacting comminuted material to form a backing, depositing abrasive granules on said backing, transferring said granules to another surface movable toward and away from said backing simultaneously redistributing said granules in uniformly spaced relation to each other, and causing said other surface to move toward said backing so that the evenly and uniformly spaced granules are forced into and seated in said backing.

4. The method of making an abrasive article which comprises pre-forming a backing of comminuted material, sprinkling a quantity of abrasive grains upon the surface of said pre-formed backing, evenly spacing the said abrasive grains relative to one another by imparting electrical charges to said grains and transferring them from said pre-formed backing to an adjacent electrically energized surface, and causing relative movement between said backing and adjacent surface to press the evenly distributed grains into said pre-formed backing.

5. The method of making an abrasive article which comprises the steps of pre-forming a backing to act as a matrix for abrasive granules, first sprinkling and mechanically distributing a quantity of diamond granules, which it is desired to embed in said matrix, upon a surface and thereafter further distributing said granules for even spacing thereof in relation to one another by transferring said granules to another surface and imparting electrical charges to said granules during said transfer and thereafter bringing said backing and other surface together to embed said evenly distributed granules in said backing.

6. The method of making an abrasive article which comprises pre-forming a backing and positioning it on one of two relatively movable and opposed press platens, distributing abrasive granules over the surface of said backing, between said platens, electrically energizing the other of said press platens and thereby transferring the said granules to said other press platen, and bringing said platen into contact with said backing to transfer the granules from said platen to said backing and to embed them in said backing.

GEORGE CROMPTON, Jr.